Figure 1:
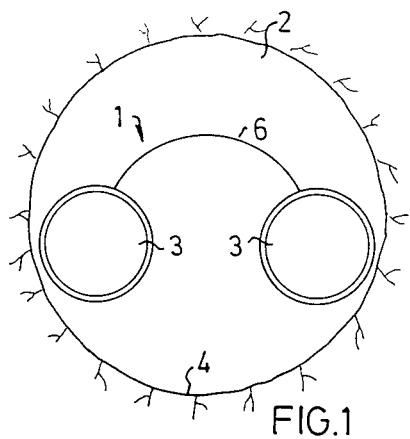

United States Patent [19]

Mogensen

[11] Patent Number: 4,715,429

[45] Date of Patent: Dec. 29, 1987

[54] METHOD AND MEANS FOR APPLYING A HEAT EXCHANGER IN A DRILL HOLE FOR THE PURPOSE OF HEAT RECOVERY OR STORAGE

[76] Inventor: Palne Mogensen, Emblavägen 29, S-182 63 Djursholm, Sweden

[21] Appl. No.: 874,962

[22] Filed: Jun. 16, 1986

[30] Foreign Application Priority Data

Jul. 2, 1985 [SE] Sweden .............................. 8503288

[51] Int. Cl.⁴ ............................................ F25D 23/12
[52] U.S. Cl. ...................................... 165/45; 62/260; 165/76
[58] Field of Search ....................... 165/45, 76; 62/260

[56] References Cited

U.S. PATENT DOCUMENTS 2,554,661  5/1951  Clancy .................................. 165/45
4,448,238  5/1984  Singleton, Jr. et al. ............... 165/45

FOREIGN PATENT DOCUMENTS 2943492  5/1981  Fed. Rep. of Germany .
408087   5/1979  Sweden .
653120  12/1985  Switzerland .

Primary Examiner—Albert W. Davis, Jr.
Assistant Examiner—Richard R. Cole
Attorney, Agent, or Firm—Armstrong, Nikaido, Marmelstein & Kubovcik

[57] ABSTRACT

The present invention relates to a method and a means for applying a heat exchanger in a drill hole (2) in rock, loose soils or the like for the purpose of heat recovery or storage, achieving a more efficient heat transfer between the defining surface (4) of the drill hole and a heating medium contained in the heat exchanger, wherein at least one heat-exchanging element (1) is lowered into the drill hole (2) and expanded in substantially radial direction so that the heat-exchanging element (1) is thus caused at least partially to be substantially in contact with the defining surface (4) of the drill hole.

7 Claims, 8 Drawing Figures

METHOD AND MEANS FOR APPLYING A HEAT EXCHANGER IN A DRILL HOLE FOR THE PURPOSE OF HEAT RECOVERY OR STORAGE

The present invention relates to a method for applying a heat exchanger in a drill hole in rock, loose soils or the like for the purpose of heat recovery or storage, achieving a more efficient heat transfer between the defining surface of the drill hole and a heat transferring medium contained in the heat exchanger, and to a heat exchanger for performing the method.

Drill holes, suitably spaced in the case of several holes, are often used for the purpose of heat recovery or storage in rock or loose soils. However, to avoid problems with the quality of the ground water and to allow the temperature to fall below the freezing point of water, it is generally preferred to recover the heat via a heat exchanger or heat collector arranged in the drill hole, through which a heat transferring medium in the form of a liquid protected against freezing is allowed to circulate. A conventional design comprises a heat exchanger in the form of a U-pipe in which both shanks consist of polyethylene pipes.

It has been found that a considerable portion of the drop in temperature from the interior of the rock to the heat-carrying liquid occurs during heat transfer between the wall of the drill hole and the circulating liquid.

The temperature drop between the wall of the drill hole and the heating medium comprises three components. The first is caused by the thermal resistance in the water between the wall of the drill hole and the exterior of the pipe. With the hole and pipe dimensions and the temperatures occurring in practice, it has been found that there is negligible convection in the water. The heat transfer thus occurs only by means of conduction. However, water is a poor heat conductor and its thermal conductivity should be compared with that of ice, for instance, which has almost four times greater thermal conductivity than water. The thermal conductance is thus improved if heat recovery is continued until the water freezes in the hole. However, the problem always remains if heat is to be supplied to the rock or soil.

The next component in the temperature drop is caused by the thermal resistance in the pipe wall. This can easily be calculated by means of known formulae and decreases with increasing pipe diameter and decreasing wall thickness.

The third component is the heat transfer resistance between the inside of the pipe wall and the heat transporting medium. This is primarily dependent on whether laminar or turbulent flow prevails in the heating medium, but pipe dimensions and surface structure are also significant. However, sufficiently low, often negligible, heat transfer resistance can always be obtained by increasing the flow rate.

To obtain a small temperature drop between the wall of the drill hole and the liquid heating medium, therefore, heat-conducting stretches in the drill-hole water should be short and the pipe should be thin-walled and have large diameter. These requirements are contrary to the desired features of conventional heat collectors in other respects. The clearance between pipe and drillhole wall should be as large as possible to enable conventional heat collectors to be fitted and the pipe walls should be thick to offer satisfactory security against rupture.

The object of the present invention is to eliminate the above-mentioned drawbacks associated with conventional technology and to effect a method and means of the type described in the introduction which will achieve a more efficient heat transfer between the surrounding drill-hole wall and the liquid heating medium.

This is achieved in the method proposed according to the invention primarily in that at least one heat-exchanging element is lowered into the drill hole, the heat-exchanging element is expanded in substantially radial direction and the heat-exchanging element is thus caused at least partially to be substantially in contact with the defining surface of the drill hole.

The method according to the invention can suitably be performed by means of a heat exchanger which is primarily characterized in that it comprises at least one heat-exchanging element arranged to expand in substantially radial direction to be substantially in contact with the defining surface of the drill hole.

According to one preferred embodiment the heat-exchanging element is in the form of two substantially parallel pipes, said expansion being effected by increasing the distance between the pipes.

Said expansion may suitably be effected by inserting a separate spacer between said pipes or by the pipes forming a a spring arrangement in relation to each other, the pipes being initially secured in contracted state and released from said contracted state after insertion into the drill hole.

According to the invention, the pipes are secured in compressed state by a securing element, a locking means or casing which is cut off, released by dissolving or heating or is mechanically removed after insertion of the assembly into the drill hole.

Contraction of the heat-exchanging element can be effected by evacuating the pipes of the heat-exchanging element or tubular parts of the spacers.

According to an alternative embodiment the pipes of the heat-exchanging element are provided with protecting vanes or the like, preferably arranged substantially at a tangent to a body located centrally between the pipes so that rotation of the central body in one direction will result in contraction of the pipes and rotation in the other direction will result in expansion of the pipes. In this case the pipes of the heat-exchanging element are suitably arranged helically so that contraction or expansion can be achieved by twisting the entire heat exchanger.

Figure 2:
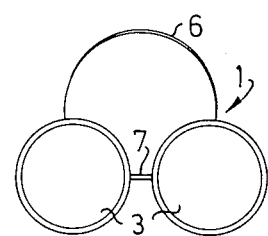
Figure 3:
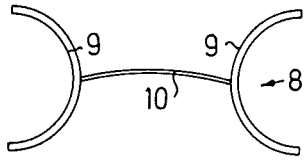
Figure 3:
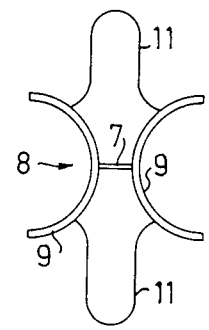
Figure 4:
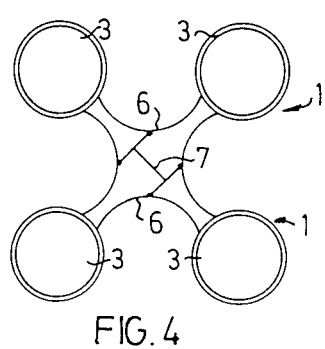
Figure 5:
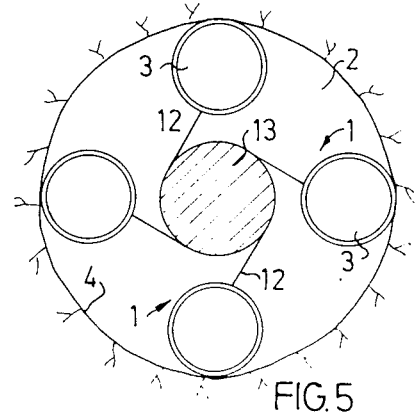
Figure 6:
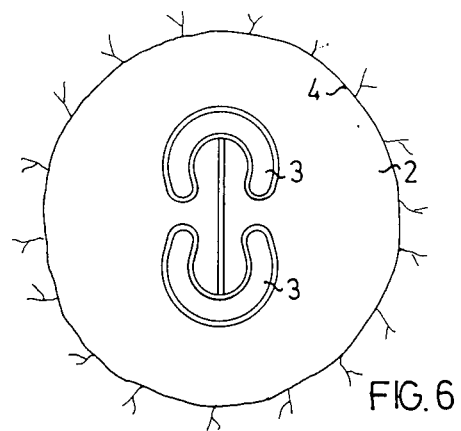

The invention will be described in more detail with reference to the accompanying drawings in which FIG. 1 shows a cross section through a heat exchanger according to the invention, arranged in a drill hole, FIG. 2 shows a cross section of a heat exchanger according to FIG. 1 in initially contracted state, FIG. 3 shows a cross section through two alternative embodiments of a separate spacer, FIG. 4 shows a cross section through a heat exchanger consisting of four pipes arranged with a spring means between them, FIG. 5 shows a cross section through a preferred embodiment of the heat exchanger according to the invention arranged in a drill hole, FIG. 6 shows a cross section through an alternative embodiment of a heat exchanger according to the invention arranged in initailly contracted state in a drill hole.

Figure 7:
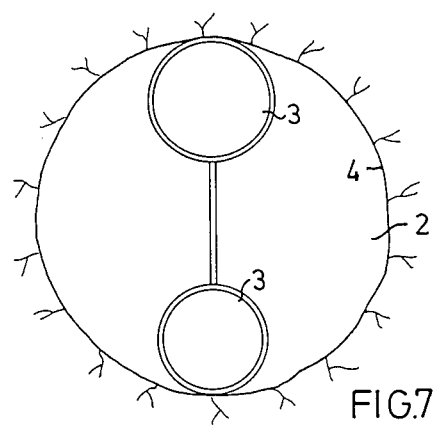
Figure 8:
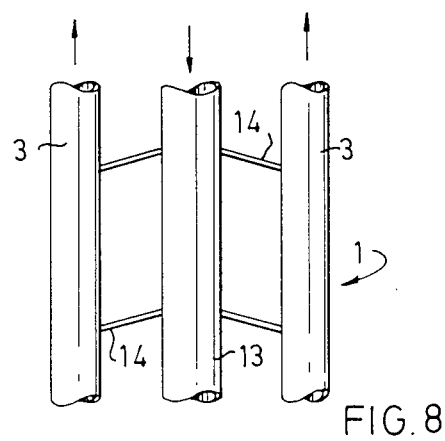

FIG. 7 shows a cross section through a heat exchanger according to FIG. 6 after expansion, and FIG. 8 shows a side view of yet another alternative embodiment of a heat exchanger according to the invention.

FIGS. 1 and 2 show a heat-exchanging element 1 applied in a drill hole 2, the pipes 3 being in contact with the defining surface 4 of the drill hole. Between the pipes is a spring element 6. The pipes 3 are initially secured together by a securing element or a detachable locking means 7.

FIG. 3 shows two alternative embodiments of a separate spacer 8 including holders 9 for the pipes of the heatexchanging element. The holders 9 are connected by a connector 10 or by a spring member 11, depending on whether the spacer element 8 is inserted subsequently or simultaneously with the heat-exchanging element. If a spring member 11 is utilized, a securing element or removable locking device 7 is also provided.

FIG. 4 shows a heat exchanger comprising four pipes 3 connected by a spring member 6, initially secured by securing elements 7 between them. If the space between the members 6 is closed the heat exchanger may be contracted by evacuating this space.

FIG. 5 shows a heat exchanger consisting of a heat-exchanging element 1 applied in a drill hole 2, its pipes 3 being in contact with the defining surface 4 of the drill hole. The pipes 3 are provided with protruding vanes 12 arranged at a tangent to a central body 13 located between the pipes 3 of the heat-exchanging element.

FIGS. 6 and 7 show a heat exchanger comprising two expandable pipes 3, which are expanded to contact with the defining surface 4 of the drill hole 2 by an internal over-pressure.

FIG. 8 shows a heat exchanger in which the pipes 3 are provided with radially protruding stays 14 extending to a central body 13 or between the pipes 3.

According to the invention a heat exchanger is lowered into a drill hole 2 for the purpose of heat recovery or storage. The heat exchanger, consisting of at least one heat-exchanging element 1, is expanded in substantially radial direction so that the heat-exchanging element 1 is brought at least partially into substantial contact with the defining surface 4 of the drill hole 2. The heat-exchanging element 1 may be in the form of pipes 3 arranged adjacent to each other, expansion being achieved by at least one of the pipes being expanded by an internal over-pressure, possibly in combination with heat, to effect permanent expansion of the pipe. Prior to application, the pipe may be evacuated, thus reducing the outer diameter of the heat exchanger. They are thus made of a material allowing expansion, such as plastic. Water is suitable pumped in under high pressure in order to effect said expansion of the pipes.

In a preferred embodiment, the heat-exchanging element 1 consists of parallel pipes 3. The heat transfer has been found to increase with increasing distance between the pipes, i.e. when the pipes approach the defining surface 4 of the drill hole. It has been found that by increasing the number of pipes 3 in the heat-exchanging element 1 the heat transfer can be increased, and also that the diameter of the individual pipes 3 in the heat-exchanging element is of relatively minor importance. A decrease in pipe diameter ensures unchanged pressure rating with thinner walls. Heat transfer can thus be further increased by arranging several thin-walled pipes 3, distributed along the periphery of the drill hole. Three to six pipes 3 are thus suitably arranged in the drill hole 2, in which case the distance between the centres of the pipes 3 should be approximately two to four times the diameter of the pipes.

A separate spacer 8 can be inserted between the pipes 3 to expand the heat-exchanging element 1. The spacer 8 may be provided with a holder 9 for each pipe, the holders being provided with a connector 10. The space 8 suitably extends along the entire length of the pipe but may of course consist of individual elements located at intervals along its length. A separate spacer 8 may also be provided prior to insertion of the heat-exchanging element 1. Such an element is suitably provided with a spring means 11 and initially also with a securing element or locking means 7. The function of such a spacer 8 is clear in the following considering corresponding members secured to the pipes.

Expansion of the heat-exchanging element 1 can also be achieved by arranging a spring member 6 between the pipes 3. The heat-exchanging element 1 is suitably manufactured in the form of a pipe section in which the pipes are kept apart by the spring member 6. The pipe section may be of polyethylene and is preferably extruded or the like. Before insertion of the heat-exchanging element 1 into the drill hole 2 the pipes can be compressed and secured in compressed state by a securing element or a locking means 7. The pipes 3 are connected by suitably means at the lower end of the heat-exchanging element 1. Said securing element or locking means 7 may consist of a casing around the heat-exchanging element 1, a joint in the form of a weld or adhesive strip between the pipes 3, gripping jaws, locking pins or the like projecting from the pipes 3. The securing element or locking means 7 may be arranged to dissolve in water or be dissolved by heat supplied by circulating hot water in the pipes 3. They may also be arranged to be cut by a cutting means which is pulled up along the heat-exchanging element 1, released or removed mechanically, for instance by removing a locking pin or a retaining band, cord or the like.

By providing the pipes 3 of the heat-exchanging element with vanes or the like projecting therefrom, preferably arranged at a tangent to a central body 13 arranged between the pipes 3, rotation of the central body in one direction will effect contraction of the pipes 3 and rotation in the other direction will effect expansion of the pipes 3. The central body 13 may consist of a pipe but it may also have some other suitable shape. The important feature is that the vanes 12 are substantially inclined in relation to the central body 13, enabling the distance of the pipes 3 from the central body 13 to be varied by rotation of the central body 13. The pipes 3 of the heat-exchanging element are preferably arranged helically around the central body 13, thus improving the rotary properties and increasing flexibility of the heat-exchanging element during insertion into the drill hole.

Stays 14 can also be arranged projecting radially between the pipes 3 and the central body 13, as shown in FIG. 8. An axial displacement of the central body 13 in relation to the pipes 3 thus causes the heat exchanger to expand towards the defining surface 4 of the drill hole.

In order to achieve said compressed state or to initially further reduce the outer diameter of the heat exchanger, the pipes 3 may also be evacuated. Neither need the pipes 3 by cylindrical. They can be shaped to give increased contact with the defining surface 4 of the drill hole.

The contraction and securing of the pipes 3 proposed according to the invention gives a heat-exchanging element 1 having an outer diameter which is considerably smaller than the diameter of the drill hole 2 and insertion of the heat exchangers is thus facilitated.

Of course the heat-exchanging element need not be initially contracted; the spring arrangement between the pipes 3 may be sufficient in certain cases to enable application of the heat-exchanging element in the drill hole.

The invention is of course not limited to the embodiments shown in the drawings. It can be varied in many ways within the scope of the following claims.

We claim:

1. A method for applying a heat exchanger in a drill hole in rock, loose soils or the like for the purpose of heat recovery or storage, achieving a more efficient heat transfer between the defining surface of the drill hole and a heat transporting medium contained in the heat exchanger, the steps comprising: lowering substantially parallel heat-exchanging pipes into position in a drill hole and with said heat-exchanging pipes in said position, expanding said heat-exchanging pipes in a radial direction into at least partial contact with the defining surface of said drill hole by increasing the distance between said pipes.

2. A method according to claim 1, wherein a spacer is inserted between said pipes.

3. A method according to claim 1, wherein said distance between said pipes is increased by a spring between said pipes.

4. A method according to claim 3, wherein said pipes are lowered into said position in said drill hole with said spring in contracted state and said spring is released from said contracted state after said pipe are in said position in said drill hole.

5. A method according to claim 4, wherein said pipes and said spring are secured in contracted state by a casing soluble in water and are released by dissolving said casing after insertion of said pipes into said drill hole.

6. A method according to claim 1, wherein said pipes are lowered into said drill hole with a body located centrally between said pipes, said pipes being connected to said body by vanes protruding from said pipes and connected tangentially to said body so that when said central body is rotated in one direction said pipes are drawn towards said central body and when rotated in the other direction said pipes are moved away from said central body.

7. A method according to claim 1, wherein said pipes are lowered into said drill holes with a central body located between said pipes, said pipes being connected to said body with protruding stays extending between said body and said pipes, whereupon axial displacement of said pipes relative to each other and to said central body in a first direction moves said pipes radially outwardly relative to said central body and to each other and in the reverse direction moves said pipes radially inwardly relative to said central body and to each other.

* * * * *